March 18, 1952 — E. W. CLARK — 2,589,991

CONSTANT CURRENT REGULATOR

Filed Nov. 4, 1950

Inventor:
Earl W. Clark,
by Russell A. Warner
His Attorney.

Patented Mar. 18, 1952

2,589,991

UNITED STATES PATENT OFFICE 2,589,991

CONSTANT CURRENT REGULATOR

Earl W. Clark, East Lynn, Mass., assignor to General Electric Company, a corporation of New York Application November 4, 1950, Serial No. 194,101

2 Claims. (Cl. 321—10)

My invention relates to apparatus for obtaining a constant direct current from an alternating current source, the voltage of which may vary considerably, and its object is to provide simple apparatus of this character which has high regulating accuracy.

In carrying my invention into effect, I employ an electric valve radio frequency oscillator circuit and control the constants of its circuit by a highly sensitive current responsive regulator connected in the output circuit of the oscillator to hold the output current constant.

In application Serial No. 719,437, filed December 31, 1946, Philip C. Michel, now U. S. Patent No. 2,584,728, dated February 5, 1952, assigned to the same assignee as the present invention, there is described an electric valve oscillator control for relays employing a metallic vane moved in response to some measured quantity, which vane varies the coupling between a pair of sensing coils in the oscillator input circuit to vary the oscillating condition of the valve and hence its output. I employ apparatus of this character in which the oscillator circuit is simplified and is provided with an antihunt coupling between input and output circuits. I also employ a current responsive device connected in the output circuit of the oscillator for moving the metallic vane, which device is of special design to make it highly sensitive to minute current chnages.

Figure 1:
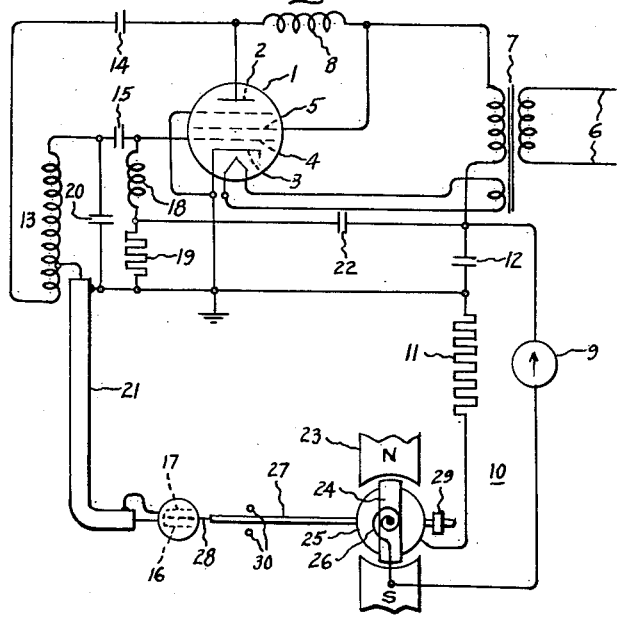
Figure 2:
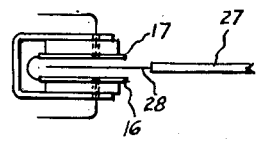
Figure 3:
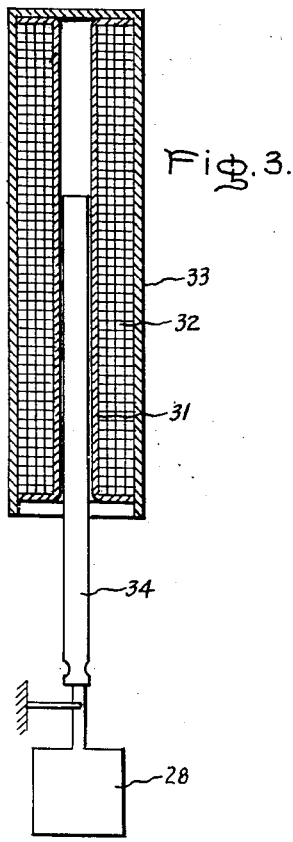

The features of my invention which are believed to be novel and patentable will be pointed out in the claims appended hereto. For a better understanding of my invention reference is made in the following description to the accompanying drawing in which Fig. 1 represents a wiring diagram of my improved oscillator circuit controlled by a highly sensitive current responsive instrument and employed to obtain a constant current. Fig. 2 is a detail plan view of the sensing coils and metallic vane used in Fig. 1, and Fig. 3 is a solenoid designed to be highly sensitive to current changes which may be used in place of the instrument form of current responsive device in Fig. 1.

In Fig. 1, I represents an electric tube valve of the evacuated type having a plate 2, cathode 3, control grid 4, and screen grid 5. The output circuit is supplied from an alternating current source 6, assumed to be a 60-cycle source, through a transformer 7, and included in the output circuit are an inductance coil 8, a current measuring instrument 9, a current sensitive control device 10, and a resistance 11. Current flowing in the output circuit is rectified direct current, and to eliminate ripples in the instrument 10, a condenser 12 is connected across the output circuit between resistance 11 and instrument 9. Instrument 9 may be eliminated but is convenient for setting the value of the constant current to be held in this circuit.

In the input circuit a two-part inductance coil 13 is connected between plate 2 and control grid 4 through coupling capacitors 14 and 15. An intermediate point of coil 13 is connected in series with an inductance comprising a pair of index or sensing coils 16 and 17 to the cathode 3 of the oscillator tube. The two parts of coil 13 are in mutual inductive relation and tend to establish oscillations while the coils 16 and 17 tend to terminate oscillations. Connected between cathode and control grid are a radio frequency choke coil 18 and grid leak resistance 19 in series. A condenser 20 is connected across coils 16 and 17 and a portion of coil 13 to form a suitably tuned circuit. The connections to and from the sensing coils 16 and 17 are preferably in the form of a concentric cable 21 to eliminate the possibilty of inductive interference. The two coils 16 and 17 are stationary and supported in close proximity to each other with a space between, as shown in Fig. 2, to permit a metal vane to be inserted between the coils to vary the inductive coupling between them. This portion of the radio frequency oscillator circuit operates in the same manner as described in the above-mentioned copending patent application.

A small condenser 22 is connected between the ripple prominent portion of the output circuit and the grid 4 of the tube to suppress ripple frequency hunting tendency. This connection is preferably not made directly to the control grid 4, but to a point between radio frequency coil 18 and grid resistance 19.

The instrument 10 is a highly sensitive direct current milliammeter having a stationary permanent magnet field 23, and a moving coil armature 24 pivoted about a stationary iron core 25. The lead-in spirals, one of which is shown at 26, are designed to provide negligible or very small torque. The instrument is provided with a relatively long pointer 27 carrying a metal vane 28 at its outer end on a radius to move between the closely spaced sensing coils 16 and 17 to vary the coupling between such coils, and hence, the constants of the tuned oscillator circuit. The tuning is made such that when the vane 28 is out of the coils, the tube I does not oscillate and maximum current flows in the output circuit; and when the vane is between the coils, the tube oscillates and there is a minimum current flow in the output circuit. At some intermediate position of the vane part way between the coils such, for example, as represented in Fig. 1, the extent of oscillation is controlled to hold the output current to a predetermined value. The instrument 10 is arranged so that its torque is clockwise and the weight of pointer and vane when in the horizontal position shown, and the counterclockwise torque of the spirals, if any, tends to turn the armature counterclockwise. This counterclockwise torque is so adjusted, as by a counterweight 29, that when the vane is in the position such as shown to hold the desired output current, the clockwise armature torque just balances the counterclockwise torque and no appreciable movement of the vane 28 occurs.

Practical maximum and minimum output current values with the vane out and in the sensing coils are 5 and 2-milliamperes, respectively, and a practical holding value of current is 3-milliamperes. For these conditions we could take a standard milliammeter normally rated 30 microamperes full scale and which before modification would have a full scale torque of 0.11 mmg. at normal 2.2 inches scale length, and assuming a pointer 2 inches in length. By replacing the usual spirals with low torque spirals that give, say, 0.06 mmg. torque at full scale, the effective scale length with 30 microamperes armature current would be $$2.2 \times \frac{0.11}{0.06} = 4 \text{ inch scale}$$

And with a 3-milliampere armature current the theoretical full scale length would be $$\left(\frac{0.003}{0.00003}\right) \times 4 = 400 \text{ inches}$$

A continuous current of 3-milliamperes will not overload the armature thermally. Now a movement of the vane 28 relative to the coils 16 and 17 on only 8 mils is sufficient to cause the output current to vary between approximately maximum and minimum values of 5 to 2-milliamperes, and hence, the modified instrument will give a control sensitivity of better than 0.008 part in 400, or better than 0.002%. This sensitivity may be further increased by lengthening the pointer. It will be further noted that if we assume, as we may, that the spiral torque is negligible and all of the counterclockwise torque is produced by gravity on the vane and pointer, this gravity torque at a horizontal position of the pointer may be considered constant within the very small horizontal pointer range of movement necessary for control, and hence, for all practicable purposes the counterclockwise torque encountered within such range of control is constant and the only variable that will change the vane position is output current. The vane will therefore seek a position where the output current is constant at 3-milliamperes with zero control error. This indicates the extreme sensitivity and accuracy that can be easily obtained. This device will hold a constant current in the output circuit for wide variations in voltage of the supply 6 with no noticeable movement of the vane 28. Pointer stops at 30 are preferably provided to prevent displacement and injury to the parts when not in use.

In place of an instrument 10 like that described, I may use a specially designed current responsive solenoid represented in Fig. 3. This solenoid is designed to have a constant upward pull sufficient to balance its weight and vane attached thereto over a range of ½ inch when the current in the solenoid is constant at a few milliamperes. In this design the hollow plunger guide tube and coil form 31 is made of brass or other non-magnetic material. A long current coil 32 is wound thereon and the coil is covered by a magnetic tube 33 closed at the upper end. The lower end of tube 33 is open and its skirt extends slightly beyond the lower end of the coil. A plunger 34 of annealed high permeability material is freely movable in the guide tube 31, and carries a metallic vane 28 (corresponding to the vane 28 of Fig. 1) at its lower end. A solenoid of this design having a plunger rod 34 two inches in length with other dimensions in the relative proportions illustrated will have a constant pull sufficient to balance the constant pull of gravity on the plunger and vane attached thereto over a vertical distance of ½ inch with constant current excitation of the coil 32 of about 30 ampere turns. The plunger is represented in approximately the lower end of this constant pull range of operation. In using such a solenoid an upward movement of plunger 34 and vane 28 would decrease the current in the output circuit of the oscillator and in coil 32, thereby reducing the upward pull, lowering the vane, and restoring the balanced regulating condition theoretically with zero regulating error. A tapered core type of constant lift solenoid may also be used.

Refer again to the antihunt condenser 22 of Fig. 1. With the large condenser 12 connected across the load resistance 11 and instrument 10 to reduce the ripple from one-half wave rectified current, there is a tendency for the load current to fluctuate about the average value due to the time constants of the circuit and the inertia of the pivoted parts of instrument 10. This tendency is effectively reduced by the antihunt condenser 12 and its connections. During the transient ripple period only, electrons flow through the antihunt condenser and grid leak resistance 19 to provide a temporary direct current grid bias of the proper polarity to tend to oppose the change in ripple voltage across the load.

Suitable values for the circuit components are as follows:

Coil 24 of instrument 10, 1500 turns, resistance 2000 ohms
Resistance 11, 15000 ohms (or less)
Condenser 12, 10 microfarads (or more)
Condenser 22, 0.1 microfarad
Condenser 14, .0007 microfarad
Condenser 15, .05 microfarad
Coil 8 air core, 2½ m. h. R. F. choke
Coil 13 magnetic core, 4 turns (plate side) 60 turns (grid side)
Coils 16 and 17 magnetic core each, 12½ turns
Coil 18 air core, 2½ m. h. R. F. choke
Resistance 19, 2.2 meg. ohms
Supply voltage at secondary of transformer 7, 160 volts, 60 cycles

What I claim as new and desire to secure by Letters Patent of the United States is:

1. Constant current regulating apparatus comprising an electric valve oscillator having input and output circuits, an inductance comprising two series connected closely spaced coils associated with said input circuit, a metallic vane movably related with said coils to vary the inductive relation between them and thereby the oscillating condition of said oscillator, a load supplied by the output circuit of said oscillator including a current responsive instrument having movable armature means secured to and for moving said vane, said instrument when energized tending to move said vane in a direction to increase oscillation and reduce the output current of said oscillator, said instrument having gravity responsive means which opposes such movement by a substantially constant force over the range of regulation, whereby the current in the output circuit of said oscillator is maintained constant.

2. A constant current regulator comprising radio frequency oscillator apparatus including an electronic valve having plate, cathode and control grid electrodes, an input circuit for said valve coupled to the plate thereof and otherwise designed to establish oscillator action of said apparatus, adjustable inductive control means in said input circuit for permitting or preventing the high frequency oscillation of said apparatus, a resistance and a radio frequency choke coil connected in series between the cathode and control grid of said valve, an output circuit connected between the plate and cathode of said valve, said output circuit including a low frequency source of supply and a load, a condenser connected across the load to suppress rectified current ripples therein, said load including current responsive control means having a movable element the controlling action of which is opposed by a substantially constant gravity force for automatically adjusting said inductive control means in a manner to maintain the output current of said valve constant and a low capacitance coupling between one terminal of said condenser and a point between said radio frequency coil and grid resistance to suppress hunting tendency in said current responsive control means.

EARL W. CLARK.

REFERENCES CITED

The following references are of record in the file of this patent:

UNITED STATES PATENTS

| Number | Name | Date |
|---|---|---|
| 2,154,260 | Brandenberger | Apr. 11, 1939 |
| 2,280,725 | Shepard, Jr. | Apr. 21, 1942 |